United States Patent
Woodward et al.

(10) Patent No.: US 6,936,295 B2
(45) Date of Patent: Aug. 30, 2005

(54) METHOD FOR TREATING LIQUID EGG WHITES

(75) Inventors: Scott Woodward, Ramsey, MN (US); Julie C. Cotton, Maple Grove, MN (US); Donald R. Roberts, St. Michael, MN (US); Nathan Rikasrad, St. Cloud, MN (US); Timothy Joseph Sarrano, Lino Lakes, MN (US); Jeff Taylor, Sartell, MN (US)

(73) Assignee: Cargill, Incorporated, Minneapolis, MN (US)

( * ) Notice: Subject to any disclaimer, the term of this patent is extended or adjusted under 35 U.S.C. 154(b) by 357 days.

(21) Appl. No.: 10/154,402

(22) Filed: May 23, 2002

(65) Prior Publication Data

US 2003/0219525 A1 Nov. 27, 2003

(51) Int. Cl.⁷ ................................................. A23L 1/32
(52) U.S. Cl. ....................... 426/614; 426/442
(58) Field of Search ................................. 426/614, 442

(56) References Cited

U.S. PATENT DOCUMENTS

| | | | |
|---|---|---|---|
| 3,987,212 A | 10/1976 | Seeley et al. | |
| 4,414,240 A | * 11/1983 | Lee | |
| 5,266,338 A | 11/1993 | Cascione et al. | |
| 5,455,054 A | 10/1995 | Bryson et al. | |
| 6,303,176 B1 | 10/2001 | Vandepopuliere et al. | |

* cited by examiner

Primary Examiner—Anthony Weier
(74) Attorney, Agent, or Firm—James P. Krueger; Peter M. Reyes

(57) ABSTRACT

The present invention is directed to a method of treating liquid egg white while not decreasing egg white functionality or causing difficulties in processing of the egg whites, such as gelation. In accordance with the invention, egg whites are blended with an amount of hydroxide solution which is effective for raising egg white pH to at least about 8.2.

20 Claims, No Drawings

METHOD FOR TREATING LIQUID EGG WHITES

The present invention is directed to a method for treating liquid egg whites that is effective for raising the pH of the liquid egg whites while maintaining their functionality. More particularly, liquid egg whites are blended with a hydroxide solution in an amount effective for increasing the pH of the liquid egg whites to a pH above about 8.2.

BACKGROUND

Liquid egg products, such as liquid egg whites, have been used for many years to replace shell eggs. Liquid egg products have generally been considered to be more convenient for use, especially on a large scale.

Liquid egg whites are typically subjected to pasteurization processes. The effectiveness of pasteurization is pH dependent and adjustment of egg white pH to greater than about 8.2 prior to pasteurization improves the pasteurization process. The pH of egg whites naturally rises as they are held in the shell. Hence, eggs which have been held in the shell for a sufficient time can be broken, separated and the egg whites effectively pasteurized without pH adjustment prior to pasterization.

As egg breaking facilities have converted to inline breaking, the time between egg laying and breaking has been reduced to effectively minimize the natural increase in egg white pH. Egg whites having a pH below about 8.2 may require pH adjustment prior to pasteurization. Methods for the adjustment of egg white pH, such as addition of sodium hydroxide pellets or concentrated sodium hydroxide solutions to the egg whites have not always been satisfactory as these methods may cause gelation of egg whites, precipitation of proteins, release of ammonia, reduction in egg white functionality, and unsafe processing conditions.

SUMMARY

The present invention is directed to a method of treating liquid egg white while not decreasing egg white functionality or causing difficulties in processing of the egg whites, such as gelation. In accordance with the invention, egg whites are blended with an amount of hydroxide solution which is effective for raising egg white pH to at least about 8.2. The use of hydroxide solution to adjust egg white pH is effective for preventing localized gelation of egg whites which may occur when hydroxide pellets are blended with egg whites. The resulting liquid egg white hydroxide blend can be effectively pasteurized at a lower temperature or for a shorter time than liquid egg whites having a lower pH.

In accordance with the invention, raw (unpasteurized) liquid egg whites may be blended with a solution of hydroxide in batch or the hydroxide solution may be blended inline during processing or unloading of liquid egg whites. In the aspect of the invention, a hydroxide solution having a concentration of from about 10 to about 50 weight percent is blended with liquid egg whites, preferably about 10 to about 30 weight percent, and most preferably about 30 weight percent. Hydroxides which are effective in the present invention include sodium hydroxide, potassium hydroxide, ammonium hydroxide, calcium hydroxide and mixtures thereof. Blending of hydroxide solution is effective for providing the liquid egg whites with a pH of from about 8.2 to about 9.5, preferably about 8.3 to about 9.2, more preferably about 8.6 to about 9.2, and even more preferably about 8.8 to about 9.2.

In an important aspect of the invention, blending of the hydroxide solution with liquid egg whites in accordance with the method of the invention does not result in localized gelling of the liquid egg whites. As used herein "gelation" refers to an increase in liquid egg white viscosity caused by denaturation of proteins. In this aspect of the invention, the liquid egg white hydroxide blend of the invention has a viscosity less than about 10 centipose, preferably about 5 to about 7 centipose.

In another aspect, the invention provides a method for pasteurization of egg whites where liquid egg whites are blended with a hydroxide solution as described above prior to pasteurization. Pasteurization is carried out by methods known in the art, however, pasteurization of egg whites having a pH of greater than about 8.2 is more effective than pasteurization of egg whites having a pH of less than about 8.2.

DETAILED DESCRIPTION

The present invention provides a method of treating liquid egg white which is effective to provide desired pH while maintaining the functionality of the liquid egg white. As used herein, the term "liquid egg white" refers to a fresh or raw (unpasteurized) egg white, in the liquid state, obtained after separating the white and the yolk by breaking fresh eggs. The liquid egg white may contain additives known in the art.

Liquid egg white functionality may be determined by a whip test or angel cake performance tests. These tests are described in Egg Science and Technology, $4^{th}$ Ed. Chap. 15, Quality Assurance, which is incorporated herein by reference.

One aspect of the present invention is disclosed as follows liquid egg white is provided in tanker truck. Liquid egg white is transported from tanker truck through conduit by use of a pump. Pumps useful for facilitating transport of the liquid egg whites may be any pump known in the art for this purpose. Prior to entering the pump, liquid egg white is contacted with a sodium hydroxide solution through an inlet port. Sodium hydroxide solution is transported from a drum through the action of a peristaltic pump. After passing through the pump, liquid egg white that has been blended with sodium hydroxide is passed through a filter. In this aspect of the invention, a standard in-line shotgun type filter may be used. The filter acts to remove larger particles and further facilitate mixing of hydroxide solution.

After passing through the filter the pH of the liquid egg white sodium hydroxide blend is measured with a pH probe which is electrically connected to a pH meter. The liquid egg white sodium hydroxide blend may pass by an additional flow sensor and an additional pump or valve prior to being stored in a storage tank.

In an important aspect of the invention, the pump, peristaltic pump, and the pH meter are all electrically connected to a controller. The controller regulates the flow of liquid egg white through the system by adjusting pumping rates in the pump and the peristaltic pump to provide sufficient sodium hydroxide solution effective for providing a liquid egg white having a pH between about 8.8 and 9.2. Preferably, the pH is maintained at a level of about 9.1. In this aspect of the invention, the flow of liquid egg white at the flow sensor will typically be about 500 to about 2000 lbs/minute, preferably about 50,000 lb per hour. Hydroxide solution may be added in accordance with the following table.

| Initial pH | Target final pH | Amount 30% NaOH per 1000 lb (lbs) | Amount 30% NaOH per 4500 lb (lbs) | Amount 30% NaOH per 5000 lb (lbs) |
|---|---|---|---|---|
| 8 | 9.0–9.2 | 1.4 | 6.3 | 7 |
| 8.2 | 9.0–9.2 | 1.1 | 5 | 5.6 |
| 8.4 | 9.0–9.2 | 0.8 | 3.8 | 4.2 |
| 8.6 | 9.0–9.2 | 0.6 | 2.5 | 2.8 |
| 8.8 | 9.0–9.2 | 0.3 | 1.3 | 1.4 |

Numerous modifications and variations in practice of the invention are expected to occur to those skilled in the art upon consideration of the foregoing detailed description of the invention. Consequently, such modifications and variations are intended to be included within the scope of the following claims.

What is claimed is:

1. A method for treating egg whites comprising blending liquid egg whites with at least a 30% hydroxide solution, the method effective for providing a liquid egg white hydroxide solution blend having a pH of at least about 8.2 without formation of egg white gelation.

2. The method of claim 1 wherein the hydroxide solution is selected from the group consisting of sodium hydroxide, potassium hydroxide, ammonium hydroxide, calcium hydroxide and mixtures thereof.

3. The method of claim 2 wherein the hydroxide is sodium hydroxide.

4. The method of claim 1 wherein the pH of the liquid egg white hydroxide solution blend is from about 8.2 to about 9.5.

5. The method of claim 1 wherein the pH of the liquid egg white hydroxide solution blend is from about 8.3 to about 9.5.

6. The method of claim 1 wherein the pH of the liquid egg white hydroxide solution blend is from about 8.6 to about 9.2.

7. The method of claim 1 wherein the pH of the liquid egg white hydroxide solution blend is from about 8.8 to about 9.2.

8. The method of claim 1 wherein the liquid egg white hydroxide solution blend has a viscosity of less than about 10 centipose.

9. A method for pasteurizing egg whites comprising:
blending liquid egg whites with a hydroxide solution having a concentration of at least 30%, the blending effective for providing a liquid egg white hydroxide solution blend having a pH of at least about 8.2 without formation of egg white gelation; and
pasteurizing the liquid egg white hydroxide solution blend.

10. The method of claim 9 wherein the hydroxide solution is selected from the group consisting of sodium hydroxide, potassium hydroxide, ammonium hydroxide, calcium hydroxide and mixtures thereof.

11. The method of claim 10 wherein the hydroxide solution is sodium hydroxide.

12. The method of claim 9 wherein the pH of the liquid egg white hydroxide solution blend prior to pasteurization is from about 8.2 to about 9.5.

13. The method of claim 9 wherein the pH of the liquid egg white hydroxide solution blend is from about 8.2 to about 9.5.

14. The method of claim 9 wherein the pH of the liquid egg white hydroxide solution blend is from about 8.6 to about 9.2.

15. The method of claim 9 wherein the pH of the liquid egg white hydroxide solution blend is from about 8.8 to about 9.2.

16. The method of claim 9 wherein the liquid egg white hydroxide solution blend has a viscosity of less than about 10 centipose prior to pasteurization.

17. A method for treating egg whites comprising:
flowing liquid egg whites through a system at a flow rate of about 500 to about 2000 lbs per minute; and
adding a hydroxide solution having a concentration of at least 30% to the liquid egg whites, the method effective for providing a liquid egg white hydroxide solution blend having a pH of at least about 8.2 without formation of egg white gelation.

18. The method of claim 17 wherein the hydroxide solution is selected from the group consisting of sodium hydroxide, potassium hydroxide, ammonium hydroxide, calcium hydroxide and mixtures thereof.

19. The method of claim 18 wherein the hydroxide is sodium hydroxide.

20. The method of claim 17 wherein the liquid egg white hydroxide solution blend has a viscosity of less than about 10 centipose.

* * * * *

UNITED STATES PATENT AND TRADEMARK OFFICE
CERTIFICATE OF CORRECTION

PATENT NO. : 6,936,295 B2
DATED : August 30, 2005
INVENTOR(S) : Scott Woodward et al.

It is certified that error appears in the above-identified patent and that said Letters Patent is hereby corrected as shown below:

<u>Title page,</u>
Item [75], Inventors, change "Rikasrad" to -- Rikansrud --; and "Sarrano" to -- Sarracco --; and insert -- Jeffrey Scherr, Clearwater, MN --.

Signed and Sealed this

Second Day of May, 2006

JON W. DUDAS
*Director of the United States Patent and Trademark Office*